Jan. 27, 1959 R. M. SHERMAN 2,870,966
BROODERS
Filed Feb. 8, 1955 6 Sheets-Sheet 5

INVENTOR
RALLSTON M. SHERMAN
BY Eney Booth Townsend
Miller + Neidner ATT'YS.

United States Patent Office 2,870,966
Patented Jan. 27, 1959

2,870,966

BROODERS

Rallston M. Sherman, Glastonbury, Conn., assignor to The Silent Glow Oil Burner Corporation, Hartford, Conn., a corporation of Connecticut Application February 8, 1955, Serial No. 486,893

6 Claims. (Cl. 237—14)

My invention relates to brooders, particularly those for chickens and other poultry.

It will be understood that in commercial practice the newly hatched chicks are placed in a brooder and remain there until mature enough to be marketed, usually about twelve weeks. Applicant has found that it is exceedingly important to so construct and heat the brooder that it constitutes a hot space for the chicks to hover in, with a cooler outside space where they may move about and feed and exercise, and at the same time have the space where they hover free from drafts. Drafts of cold air entering the hover space, particularly along the floor of such space, it has been found not only cause a high mortality among the chicks due to pulmonary diseases induced by such drafts but check the growth of the surviving chicks during the first few days of their lives. The chicks do not recover from such checking of their growth, with the result that the mature chickens are stunted and weigh less. It is of importance to avoid this stunting effect, because poultry which weighs more commonly brings a premium price per pound.

It is among the objects of the present invention to secure the desirable results above indicated by provision of a hover space in which the chicks are heated predominantly by radiant heat, as distinguished from heated air, and with substantially total elimination of convection currents particularly those which would cause a draft of cold air into the hover space along the floor of such space from outside that space, while a further object is to purge the hover space of ammonia fumes generated by the droppings of the chicks, such ammonia fumes it having been found where such space is not so purged acting to make the chicks susceptible to pulmonary infections which, as above mentioned, cause high mortality among them and tend to check the growth of the survivors.

The above and still further objects of the invention will be best understood from the following description when read in the light of the accompanying drawings of several embodiments of the invention selected for illustrative purposes, while the scope of the invention will be more particularly pointed out in the appended claims.

Figure 1:
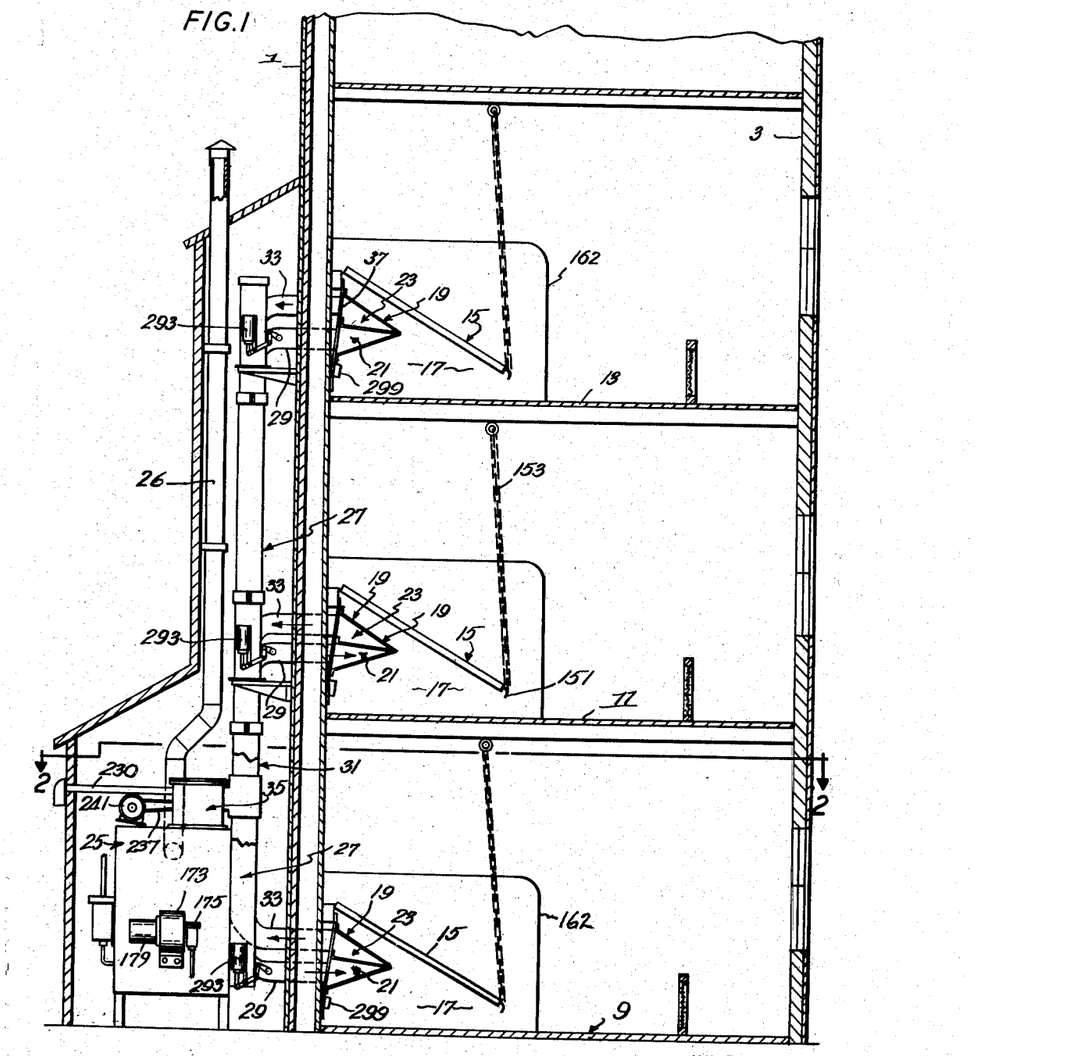
Fig. 1 is a vertical section of a building having a plurality of floors, on each of which floors is installed a brooder according to the invention, with parts in elevation.
Figures 2, 3:
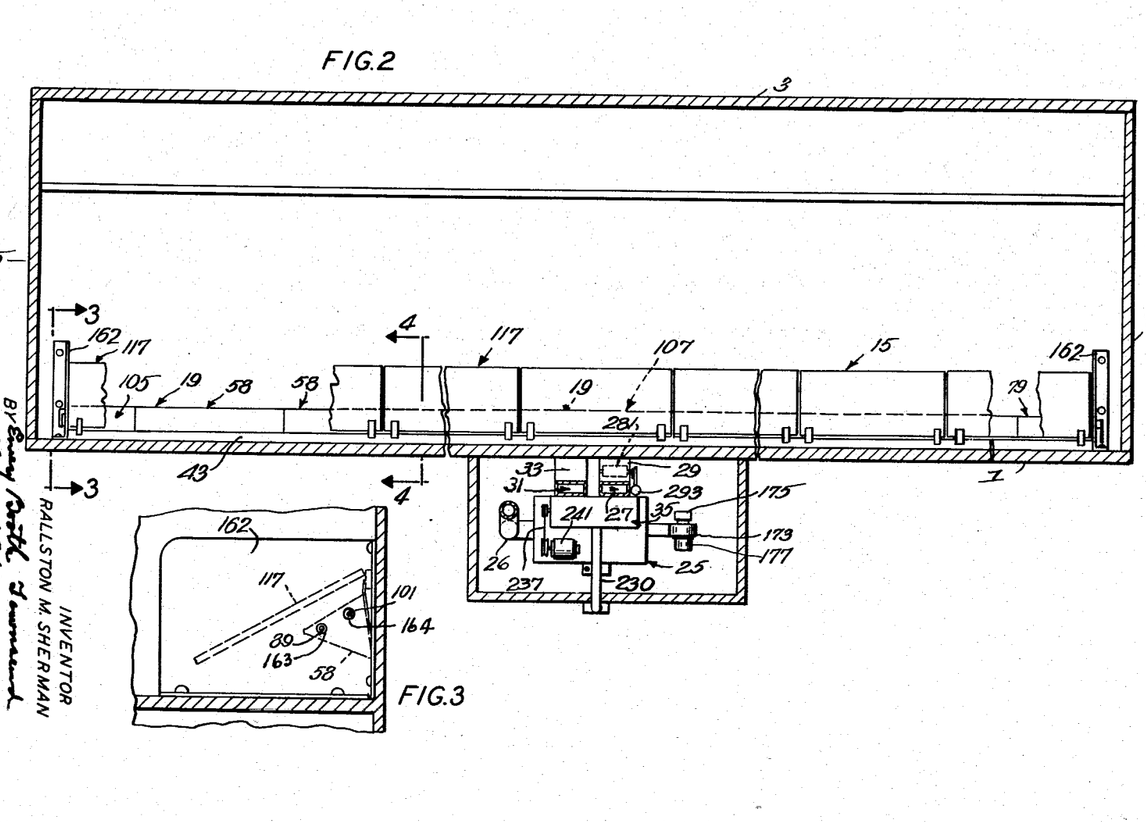
Fig. 2 is a section on the line 2—2 of Fig. 1.
Fig. 3 is a section on the line 3—3 of Fig. 2 on an enlarged scale, with parts omitted.

The installation illustrated by Figs. 1 and 2 comprises a building having opposite side walls 1 and 3, end walls 5 and 7, a first floor 9, a second floor 11, and a third floor 13. On each floor is a brooder extending lengthwise of the wall 1, such brooder comprising a sectional hover 15 forming a hover space 17, and in such space a structure generally indicated by the reference character 19 providing a hot air conducting conduit 21 and a return conduit 23 for the air discharged from the conduit 21.

As shown, all the conduits 21 are supplied with humidified hot air from a common hot air heater and humidifier 25, having a stack 26, through a conduit 27 having branches 29 severally connected to the conduits 21 at points approximately midway the lengths of the latter. At each of its opposite ends each conduit 21, as hereinafter described, is connected to the adjacent end of the conduit 23. Each conduit 23 is shown as connected approximately midway its length to a common conduit 31 by a branch 33 of the latter, the conduit 31 being connected to a blower 35 which discharges air from such conduit into the heater 25 so that such air may be reheated. In this way the air is caused to circulate in a substantially closed system through the heater, conduit 27 supplied by the heater, conduits 21 connected to the conduit 27, conduits 23 into which the conduits 21 discharge, and conduit 31 connected to the conduits 23 and leading back to the heater.

Figures 4, 5:
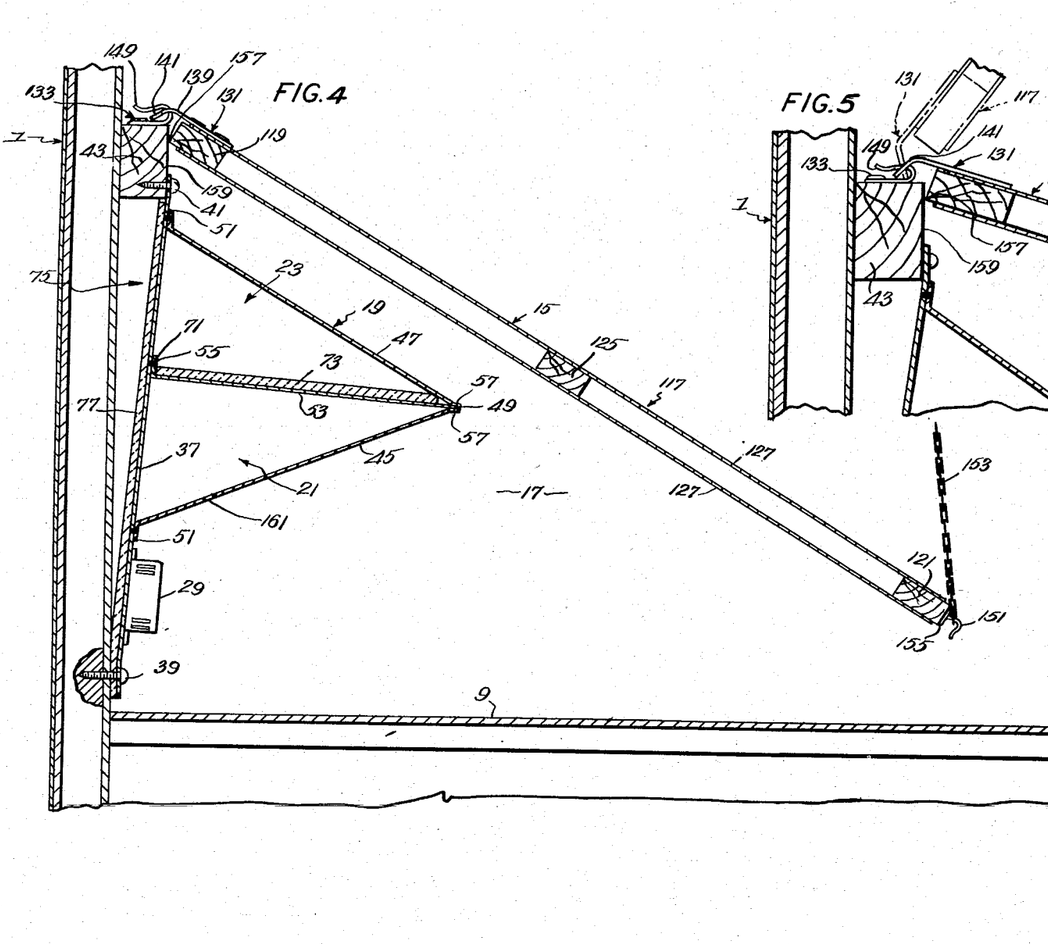
Fig. 4 is a section on the line 4—4 of Fig. 2 on an enlarged scale, with parts omitted.
Fig. 5 illustrates a fragment of Fig. 4 on an enlarged scale, with parts in different operative positions.

Referring to Figs. 4 to 9, each brooder, as shown, comprises an elongated back plate 37 having its lower edge adjacent the floor 9, 11 or 13 and secured at that edge by screws 39 to the wall 1 of the building, and at its upper edge secured by screws 41 to a horizontal wooden strip 43 fixedly carried by said wall. Carried by the back plate is shown an elongated metal strip bent to form, when the conduits 21 and 23 are viewed in transverse cross-section, the lower side 45 and upper side 47 of a triangle the base of which is formed by the back plate and the apex portion 49 of which projects away from the wall 1. As shown, the strip at opposite edges thereof is formed with the longitudinally extending flanges 51 which are spot welded to the back plate. Dividing the triangle just described into two smaller triangles, the lower of which forms the hot air conducting conduit 21 and the upper of which forms the air return conduit 23, is a longitudinally extending metal strip 53 having at one edge a flange 55 spot welded to the back plate, the outer and opposite edge of the strip extending to the apex portion of the larger triangle and being secured to that portion by crimping or bending the latter about the portion of the strip adjacent said outer and opposite edge as indicated at 57 (Fig. 4). Preferably the downward slant of the upper side 47 of the duct or conduit 23 is such as will prevent the chicks, when they become mature enough to do so, from roosting thereon so as to prevent fouling of said side by droppings. The upward slant of the lower side 45 of the duct or conduit 21 is such as to radiate heat downwardly and outwardly over the floor, and to promote such radiation the lower exterior surface of such side may be painted or otherwise treated to make it dull black in color.

As hereinbefore indicated, the structure 19 comprising the back plate 37 and conduits 21 and 23 may be formed in longitudinally extending sections for convenience of manufacture and installation. Neglecting the end sections, each of these sections indicated in Fig. 2 at 58 is shown (see Figs. 7 and 8) as provided at one end thereof with a pair of sleeve-like members 59 inserted in and projecting from and fitting the walls of the conduits 21 and 23, to which walls they may be secured by spot welding. The projecting portions of these sleeves are adapted to be received within the end portions of the corresponding conduits at the plain end of an adjacent section to make a joint between the two sections. As shown, the wall 61 of the sleeve-like member inserted in the upper conduit 23, which wall lies against the back plate 37, is spaced at its lower edge 63 from the adjacent edge 65 of the wall 67 of the sleeve, which last mentioned wall lies against the upper side of the strip 53 forming the bottom of such conduit, to form a space 69 which receives the flange 55 of said strip, the lower edge 63 of the wall 61 lying against the upper edge 71 of said flange. For reasons of simplifying production the sleeve-like member 59 received in the lower conduit 21 is identical with the sleeve-like member 59 received in the upper conduit 23.

Figures 6, 7, 8, 9:
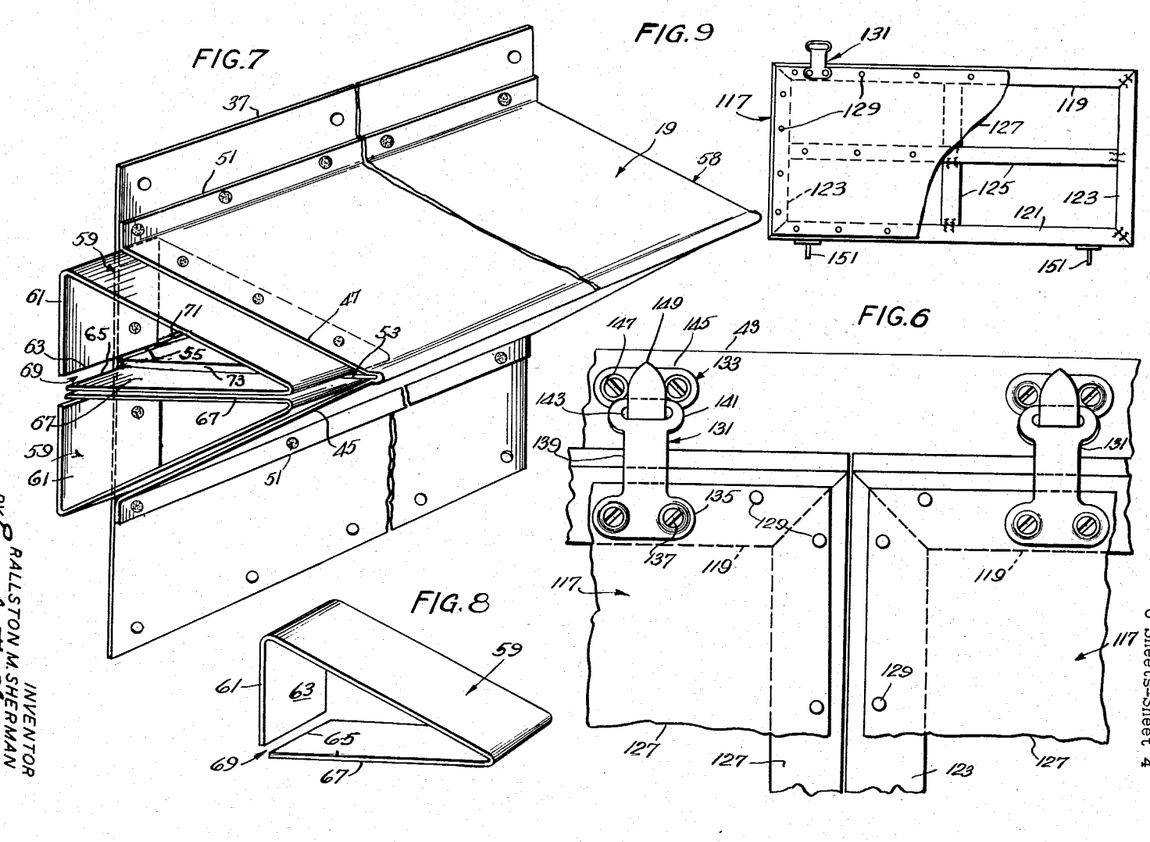
Fig. 6 is a plan of a fragment of the parts shown by Fig. 4 on an enlarged scale.
Fig. 7 is a perspective of one section of the air conducting conduits and associated plate carrying such conduits shown by Fig. 4.
Fig. 8 is a perspective of a part of the conduit section shown by Fig. 7.
Fig. 9 is a plan of the hover according to Fig. 4, with parts broken away.

Preferably, for reducing conduction of heat from the lower hot air conducting conduit 21 of the brooder to the upper return conduit 23 for the air, there is placed on the strip 53 separating those conduits, and on that portion of the wall 67 of the sleeve-like member 59 which is within the conduit 23 and welded to said strip, a layer 73 of heat insulating material substantially coextensive in width with that of said strip and covering all of the strip except the portion thereof which is adapted to contact that portion of the wall 67 of the sleeve-like member, of an adjacent section, inserted in the conduit 23. In the construction shown the back plate 37 of the brooder is spaced substantially throughout its width from the wall 1 of the building to provide a substantially dead air space 75 which insulates the back plate 37 from said wall. Preferably, further to insulate such plate, there is placed on its side adjacent the wall a layer 77 of heat insulating material.

The right hand end section 79 of the sectional structure 19 forming the conduits 21 and 23, as best shown in Figs. 10 to 13, is identical with the sections 58 except that the conduits 21 and 23 of the end section 79 are closed at the extreme end of such section by a cap 81 which is removably secured to that end by screws 82, and the strip 53 separating such conduits is provided adjacent the cap with an elongated opening 83 placing the two conduits in communication so that the air flowing through the conduit 21 will discharge from the end of that conduit into the adjacent end of the conduit 23. As shown, this opening is provided with a damper 85, there being means at the exterior of the cap for adjustably positioning the damper for varying the effective size of such opening.

Figure 10:
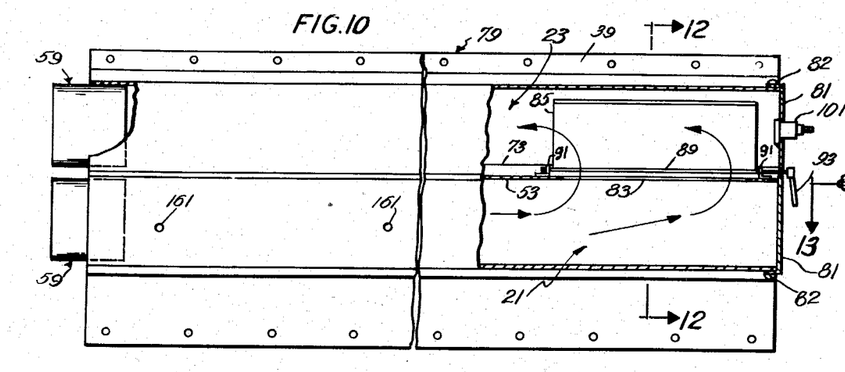
Fig. 10 is a side elevation of one of the end sections of the air conducting conduits and associated parts shown by Figs. 1, 2 and 4, with parts broken away.
Figure 11:
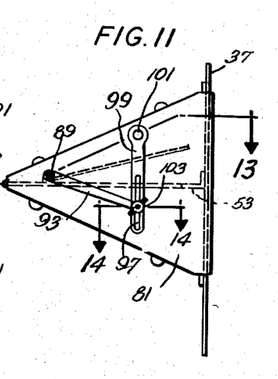
Fig. 11 is an end elevation of the section according to Fig. 10.
Figures 12, 14:
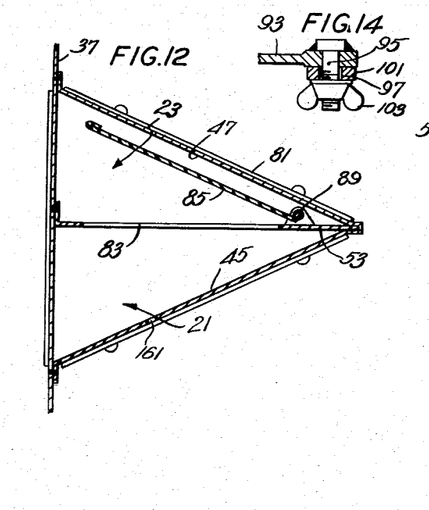
Fig. 12 is a section on the line 12—12 of Fig. 10.
Figs. 13 and 14 are, respectively, sections on the lines 13—13 and 14—14 of Fig. 11 on an enlarged scale and with parts omitted.

As shown, the damper 85 is carried by an elongated rod 89 to which the damper at one edge thereof is secured in any suitable manner, as by welding. This rod adjacent its opposite ends is trunnioned in ears 91 carried by the strip 53 adjacent the outer longitudinally extending edge of the opening 83 in said strip. The rod 89 is shown as extending through the cap 81 to the outer side of the latter where it removably and fixedly carries a radially projecting arm 93 for turning the rod. At its outer end the arm fixedly carries a stud 95 which projects through an elongated slot 97 extending longitudinally of a link 99, the link being swingingly mounted at its upper end on a stud 101 fixedly carried by and projecting from the outer side of the cap 81. At its outer screw-threaded end the stud 95 is shown as carrying a thumb-nut 103. It will be observed that by loosening the thumb-nut the stud 95 may be slid longitudinally of the slot 97 to swing the arm 93 for adjusting the damper into various positions, in which positions the damper may be securely held by tightening the thumb-nut.

The corresponding section 105 at the left hand end of the sectional conduit structure 19, as viewed in Fig. 2, is identical with the section 79 at the right hand end of that structure except that the sleeves 59 of the section 105 are omitted.

By use of the dampers 85 at each of opposite ends of the conduits 21 and 23 the amount of air flowing through each longitudinally extending half of those conduits supplied to the conduit 21 from the heater by the conduit 27 and returning through the conduit 23 to the conduit 31 leading back to the heater may be varied with relation to the amount flowing through the other half. This is commonly necessary because one end of the building commonly tends to be colder than the other end. Also by use of the dampers the total amount of air flowing through the connected conduits 21 and 23 on one floor of the building may be varied with relation to the total amount of air flowing through the corresponding conduits on other floors, which likewise commonly may be necessary because one floor may tend to be colder than another floor.

Figure 15:
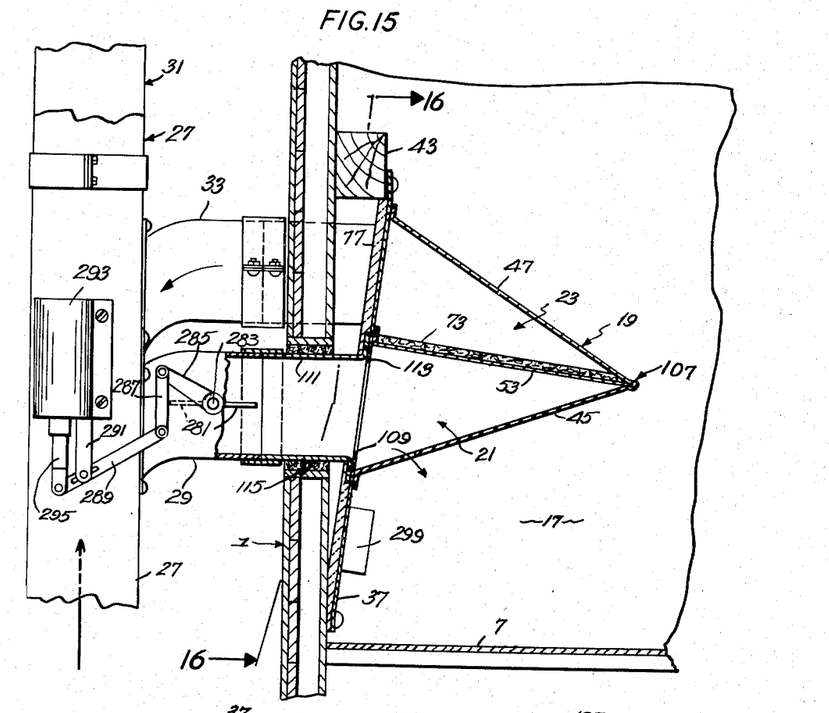
Fig. 15 is an elevation, on an enlarged scale, of a fragment of the parts shown by Fig. 1, with parts broken away.
Figure 16:
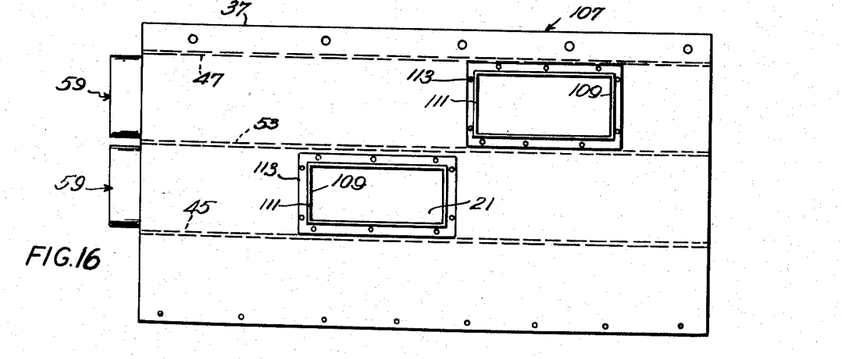
Fig. 16 is a section on the line 16—16 of Fig. 15, with parts omitted.

The central section 107 of the structure forming the hot air conducting conduit 21 and return conduit 23 is identical with the sections 58 except that, as best shown in Figs. 15 and 16, the back plate 37 of said section 107 is formed with a pair of rectangular openings 109 spaced from each other longitudinally of the conduits 21 and 23 and opening into said conduits respectively. About the edges of each of these openings the back plate carries a rearwardly extending sleeve 111 of rectangular cross-section having a flange 113 welded to the rear side of the back plate. As shown (Fig. 15), each sleeve extends through an opening 115 in the building wall 1 to the outside of said wall where the end of the sleeve communicating with the conduit 21 is connected to the adjacent branch 29 of the hot air supply conduit 27 leading from the heater and the sleeve communicating with the conduit 23 is connected to the adjacent branch 33 of the conduit 31 leading back to the heater.

As best shown by Figs. 4, 5, and 6, each section 117 of the hover 15 comprises a wooden frame having the opposite longitudinally extending edge members 119 and 121, opposite end member 123, and cross members 125, this frame at each of opposite sides thereof being covered with a metal sheet 127, preferably of galvanized iron or polished aluminum, secured at its edges to the frame by wood screws 129. The hollow substantially air tight hover structure thus formed serves to make the hover heat insulating, as do likewise the polished surfaces of the metal covering sheets 127, the interior or lower covering sheet also acting as a reflector to reflect heat downward into the space beneath the hover. Preferably the metal covering sheets do not extend all the way to the edges of the frame so that the outer edges of the wooden end strips of the section may be planed to make a proper fit with those of adjacent hover sections, and the outer edge of the wooden edge strip 119 may be planed to make a proper fit with the wooden strip 43 on the building wall, for reasons hereinafter more fully explained.

As shown, each hover section 117 is hingedly connected to the longitudinally extending wooden strip 43 on the wall 1 by a pair of members 131 secured to the upper edge portion of the section adjacent its opposite ends, respectively, and by cooperating members 133 resting on and secured to the upper edge of said strip. As shown, each member 131 has a base portion 135 (Fig. 6) resting on the upper side of the hover section and secured thereto by wood screws 137 extending into the wooden edge strip 119 of the section. Extending outward from the base portion 135 is a shank 139 having a downturned end portion 141, which latter is provided with a slot 143 extending transversely of the shank. The member 133, as shown, is provided with a base portion 145 resting on and secured by wood screws 147 to the upper side of the strip 43. Connected to the base portion 145 the member 133 has a shank 149 which is reversely bent to form a hook loosely extending through the slot 143 of the member 131 for effecting the hinged connection between the hover section and the strip 43.

At its edge constituted by the wooden strip 121 each hover section is shown as provided with a pair of hooks 151 (Figs. 1, 4 and 9) each positioned opposite one of the hinge members 131 on the section. Each of these hooks is adapted to be inserted in selected links of a chain 153, the upper end of which chain is attached to the ceiling as clearly indicated in Fig. 1. In this way the hover sections may be swung vertically into adjusted positions to position their lower edge corners 155 (Fig. 4) at different distances from the floor. The parts are so shaped that the hinge members 131 may not only swing relative to the hinge members 133 but slide on the hooked portions of the members 133 as the hover sections are adjusted vertically, the chains 153 when secured to the hooks 151 extending upward at an inclination toward the wall 1 so that the hover sections tend bodily to swing toward that wall to effect such sliding and thereby cause the lower corner 157 (Fig. 4) at the upper edge of each section at all times to bear against the outer face 159 of the strip 43 until the section is positioned approximately horizontally, as indicated by the hover in different positions of adjustment shown by Fig. 4 taken with Fig. 5. This construction also permits the hover section to be manually swung vertically upward past the horizontal high enough to cause its upper edge to lie against the inner side of the wall 1 where it will remain without use of the chains 153. Also, when the hover is approximately in its dotted line position of Fig. 5, the hinge members 131 may be readily detached from the hinge members 133 by pushing the lower edge portions of the hover sections rearwardly toward the wall 1, while the two members may be readily attached by movement of the lower edge of the hover section in the opposite direction when the section is in such dotted line position.

As an example of a brooder constructed as above described, but without limitation thereto, each triangular duct or conduit 21 and 23 may be about 6 inches wide at its base constituted by the back plate 37 and have an altitude defined by the width of the strip 53 of about 12 inches, the duct 23 at its highest point being about 20 inches above the floor. The sheet metal of which the brooder ducts and back plate are constructed is preferably of such thickness consistent with structural strength as will present a minimum weight of metal so as to permit the ducts to heat up and cool down as quickly as possible, and in this example of them may be about 0.030 inch thick. In this example the hover sections 117 may be about 36 inches wide with their under sides at their highest points about 23 inches above the floor, and, when in their lowest position of adjustment, with the lowest point of their under sides about 4 inches above the floor.

The capacity of the blower 35 preferably is such as to move the hot humid air, supplied by the heater, through the ducts 21 and 23 at a velocity high enough to prevent too great a difference in temperature between the point of entrance of such air to the duct 21 and its point of discharge from said duct, so as to maintain a proper temperature in the space beneath the hover at all points lengthwise thereof, which latter temperature to secure best results it has been found should be from about 200 to 380° F. Such temperature beneath the hover will ordinarily be secured with a brooder according to the above example when the ducts are about 100 feet long measured from the point of entrance of the hot air to the duct 21 to the discharge end of that duct, if the temperature of the air entering the duct 21 is from about 400 to 450° F. and the temperature of the air discharged from the duct 23 is about 220° F., under which conditions with a hover according to that example the temperature of the lower inclined wall of the duct 21 at the point of entrance of the air to that duct will be about 380° F. and the temperature of such wall at the discharge end of such duct about 250° F.

Maintaining a relatively high temperature of the lower inclined wall of the duct 21, say a temperature of 380° F. at the point of entrance of the air to such duct to a temperature not less than 250° F. at the end of the duct, causes the chicks hovering beneath the duct to be almost exclusively heated by radiant heat. In this respect the construction is such that the heated air in the hover space is trapped therein so that convection currents moving along the floor through the space between the floor and the lowermost edge of the hover are reduced to a minimum, in that way avoiding chilling of the chicks by cold air entering the hover space, which is of great importance for reasons hereinbefore pointed out. For further insuring against the entrance of cold air to the hover space the lower inclined wall 45 of the duct 21 may be provided at spaced points along its length with small holes or perforations 161 (Fig. 4), say, but without limitation thereto, holes about ⅛ inch in diameter spaced 3 feet apart, for discharging hot humid air from the duct 21 into the space beneath the hover. Such air so discharged will cause a gentle flow of air from the space beneath the hover through the space between the floor and the lower edge of the hover and thus effectively prevent cold air from flowing along the floor through the last mentioned space into the space beneath the hover. Such flow of air through the holes 161 further will act to purge the air in the hover space to remove from that space the hereinbefore mentioned ammonia fumes. For replenishing the circulatory air system with air which escapes through the perforations 161 the suction side of the blower 35 may be connected by a pipe 230 (Figs. 1 and 2), which pipe may be provided with a damper (not shown) for regulating the amount of air drawn through it into the blower.

The humidified air from the heater and humidifier 25 discharged through the holes 161 in the lower inclined wall of the duct 21 also serves to maintain the air in the hover space at relatively high humidity. It has been found that to prevent pulmonary disorders in the chicks, resulting in high mortality among them and checking of the growth of their survivors, best results are secured when the relative humidity of the air in the hover space does not fall below about 75 percent. Lower humidity makes the chicks subject to the above mentioned pulmonary disorders which, as above explained, act to check the growth of their survivors, and also act to desiccate the surviving chicks thereby further checking their growth.

Adjacent ends of the hover sections preferably are positioned with a minimum of clearance between them so as to avoid upward escape of air from beneath the hover tending to cause the just mentioned drafts of cold air between the floor and the adjacent edge of the hover. It has been found that the air discharged through the holes 161 acts also to prevent such drafts of cold air adjacent the ends of the hover sections, and that if such drafts should occur at such points the chicks when hovering will avoid those points.

Figure 13:
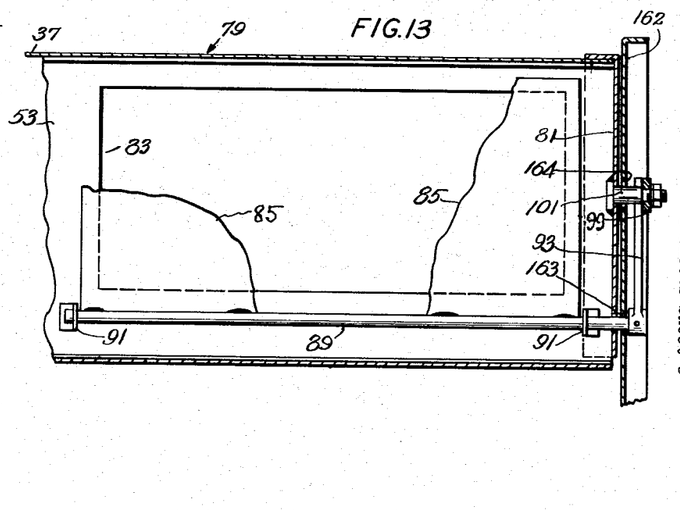

Also the extreme ends of the space beneath the hover, which ends are preferably close to the end walls of the building, are shown as closed by sheet metal partitions 162 (Figs. 2, 3 and 13), each cooperating with the adjacent end of the adjacent hover section for that purpose. As shown by Figs. 3 and 13, these partitions are formed with openings 163 and 164 through which project the rod 89 and stud 101, respectively, of the mechanism for operating the adjacent damper 85.

It will be observed that the portion of the back plate 37 below the duct 21 is heated by conduction from the hot air in that duct. This, in conjunction with the dead air space between the back plate and the wall 1 of the building, prevents cooling of the adjacent portions of the hover space and in fact acts to heat such space. It will be understood, that as the lower inclined wall of the duct 21 radiating heat downward and outward toward the entrance to the hover space progressively becomes cooler as said wall extends toward the discharge end of said duct, the hovering chicks will position themselves progressively closer to the back plate. For this reason the temperature of the lower inclined wall of the duct 21 is not critical so long as it does not fall below an undesirable minimum, it being observed that even though such temperature may be very high the chicks cannot contact said wall. In fact, for reasons which applicant will not attempt to explain, the chicks seem very partial to hovering in a space exposed to radiant heat of a very high temperature in the order of those hereinbefore mentioned.

As best illustrated in Figs. 1 and 15, each branch conduit 29 leading from the hot air supply conduit 27 to the brooder conduits 21 is provided with a damper 281 for establishing and interrupting flow of hot air through such branch conduit. The operating shaft 283 of the damper, opposite ends of which shaft extend through opposite walls of the branch conduit, on which walls the shaft is rotatably mounted, has, as shown, fixedly secured thereto at one of said ends a crank arm 285. This crank arm is shown as pivotally secured at its outer end to the upper end of a link 287, the lower end of the link being pivotally secured to the outer end of a lever 289. This lever intermediate its length is shown as pivotally and slidably secured to the lower end of a fixed bracket 291 extending downward from a casing 293 housing operating mechanism for the damper, which casing is fixedly secured to one side of the conduit or duct 27. Reciprocally mounted in this casing and extending from its lower end is a rod 295, which rod at its lower end is pivotally secured to the end of the lever 289 opposite the end thereof to which the link 287 is pivotally secured. The stroke of the rod 295 is such that when the rod makes its upward stroke the damper will be turned from its horizontal open position shown by Fig. 15 to position it vertically so as to interrupt flow of air to the brooder conduit, and when moved downward to its horizontal position shown by Fig. 15 the damper will again be in open position. A number of forms of damper operating means that may be contained in a casing, exemplified by the casing 293, having a reciprocatory rod, exemplified by the rod 295, are commercially available. In its simplest form such means comprises a solenoid and a cooperating armature connected to the upper end of the reciprocatory rod 295, which armature is drawn upward to move the rod through its upward stroke when the solenoid is energized and which permits the rod through its weight and the weight of the armature to make its downward stroke when the solenoid is deenergized. Other forms commercially available comprise an electric motor, with suitable energizing and reversing and limit switches, for operating mechanism for raising the rod through its upward stroke when its solenoid is energized and moving the rod through its downward stroke when such solenoid is deenergized. As all these forms of electric damper operating means are well known, and as they specifically form no part of the present invention, they will not be further described.

For controlling the dampers 281 for establishing and interrupting the supply of air to the brooder conduits 21, and the operation of the blower 35 and oil burner, each brooder is shown as provided with a thermostatically controlled switch, indicated at 299 (Figs. 1 and 4), which may be mounted on the back plate 37 of the brooder approximately midway the length of the brooder conduit 21 measured from the point of connection of the branch conduit 29 thereto and its end remote from such point, but one such switch being employed for each brooder.

By use of conventional circuit means the thermostatically controlled switch 299 on the back of each brooder may control the damper 281 associated with that brooder to close it upon the brooder temperature exceeding a predetermined maximum to interrupt the supply of hot air of the brooder conduit 21 and to open the damper upon such temperature falling to a predetermined minimum to establish such supply. As shown, the heater is supplied with fuel for heating the air by means of a conventional gun burner having the blower 173, oil pump 175, and electric motor 177 for driving the blower and pump. The blower 35 may be driven by an electric motor 241 connected thereto by a belt 237. The motor 177 and motor 241, as is usual in cases of an air heater of this sort provided with a discharge blower, may be electrically connected in parallel so that one operates when the other operates. If the temperature of the air supplied by the heater unduly rises in cases where the thermostats 299 cause all the dampers 281 to close, the "overheat" switch, with which heaters of this sort are commonly provided, will by use of known associated circuit means interrupt operation of the motors 177 and 241 to place the heater and blower 35 out of operation until the heater cools down, whereupon said "overheat" switch will reestablish operation of said motors.

The brooder constructed according to Fig. 4 not only effectively secures the desired results but does so with employment of a minimum amount of metal for the two brooder ducts 21 and 23 which promotes rapid heating up and cooling down of the brooder in response to opening and closure of the dampers 281 and establishment and interruption of the operation of the heater and blower 35, thus rendering the brooder susceptible of sensitive control.

It will be understood that within the scope of the appended claims wide deviations may be made from the forms of the invention herein described without departing from the spirit of the invention.

I claim:

1. A chicken brooder comprising means presenting a flat floor for the chicks to be brooded and a vertical wall surface rising from said floor, an elongated horizontally extending hover above said floor having a lower horizontally extending edge in vertically spaced relation to said floor, the hover being inclined upwardly from said edge to an upper horizontally extending edge thereof adjacent said wall surface, a horizontally extending relatively thin gauge sheet metal conduit beneath said hover adjacent said wall surface and the higher portion of said hover, which conduit has a lower flat wall upwardly inclined from a lower edge thereof adjacent said wall surface and spaced from said floor to an upper edge thereof adjacent said hover and spaced from said wall surface for radiating heat downwardly and outwardly at an inclination on those portions of said floor beneath said hover which extend toward the lower edge of said hover, and means for supplying said conduit with high temperature air at a pressure only slightly above atmospheric for flow through said conduit for causing such radiation.

2. A chicken brooder according to claim 1 in which the conduit is so formed as to have a wall of heat conductive metal that extends downwardly from the lower edge of the inclined wall of the conduit to adjacent the floor for radiating heat outwardly over the floor toward the lower edge of the hover.

3. A chicken brooder according to claim 1 in which the conduit has a flat back wall of heat conductive metal positioned adjacent the wall surface that rises from the hover floor, which back wall has a portion integral therewith that extends downwardly from the lower edge of the inclined wall of the conduit to adjacent the floor for radiating heat outwardly over the floor toward the lower edge of the hover, said inclined wall of the conduit being secured at its lower edge to said back wall.

4. A chicken brooder according to claim 1 in which the conduit is part of a conduit of larger transverse cross-section having, as viewed in such cross-section, a generally vertically extending wall adjacent the wall surface that rises from the brooder floor and having a downwardly inclined top wall adjacent the under side of the hover that meets at its lower edge the outer edge of the lower upwardly inclined wall of the conduit of claim 1 at an apex which is horizontally opposite the back wall, a partition extending from adjacent said apex to said back wall for dividing said conduit of larger cross-section into upper and lower conduits of triangular transverse cross-section, the lower constituting the conduit of claim 1 and the upper constituting a return conduit for the air flowing through said lower conduit, said partition operatively being formed to present an opening adjacent the ends of said upper and lower conduits for placing them in communication.

5. A chicken brooder according to claim 1 in which the conduit is part of a conduit of larger transverse cross-section having, as viewed in such cross-section, a generally vertically extending wall adjacent the wall surface that rises from the brooder floor and having a downwardly inclined top wall adjacent the under side of the hover that meets at its lower edge the outer edge of the lower upwardly inclined wall of the conduit of claim 1 at an apex which is horizontally opposite the back wall, a partition extending from adjacent said apex to said back wall for dividing said conduit of larger cross-section into upper and lower conduits of triangular transverse cross-section, the lower constituting the conduit of claim 1 and the upper constituting a return conduit for the air flowing through said lower conduit, said partition operatively being formed to present an opening adjacent the ends of said upper and lower conduits for placing them in communication, means for circulating hot air through said upper and lower conduits comprising an air heater for receiving air from said upper conduit and discharging it into said lower conduit, and blower means for causing such air so to circulate.

6. A chicken brooder according to claim 1 in which the inclined wall of the conduit is formed with small apertures for discharge from the conduit of air for freshening the air beneath the hover.

References Cited in the file of this patent

UNITED STATES PATENTS

| | | |
|---|---|---|
| 1,592,377 | Martin | July 13, 1926 |
| 1,974,116 | Martin | Sept. 18, 1934 |
| 1,995,481 | Myers | Mar. 26, 1935 |
| 2,059,819 | Smith | Nov. 3, 1936 |
| 2,198,136 | Stuart | Apr. 23, 1940 |
| 2,269,036 | Nessell | Jan. 6, 1942 |
| 2,304,124 | Sampsel | Dec. 8, 1942 |
| 2,360,343 | Hill | Oct. 17, 1944 |
| 2,385,682 | Burkholder | Sept. 25, 1945 |
| 2,423,241 | Kurth et al. | July 1, 1947 |
| 2,560,246 | Ream | July 10, 1951 |
| 2,593,029 | Holdredge | Apr. 15, 1952 |
| 2,629,309 | Lahti | Feb. 24, 1953 |